UNITED STATES PATENT OFFICE 2,343,111

METHOD OF PRODUCING THE SODIUM HYDROXYLATE OF AN ARYL ALDEHYDE

Albert F. Hardman, Akron, Ohio, assignor to Wingfoot Corporation, Akron, Ohio, a corporation of Delaware No Drawing. Application May 2, 1942,
Serial No. 441,529

6 Claims. (Cl. 260—600)

This invention relates to a new method of producing an hydroxy-naphthaldehyde or other hydroxyl aryl aldehyde in the form of sodium or other metallic hydroxylate. The aldehydes are old in the art, and various methods of producing them have been described. However, there are advantages in the new method of this invention which involves treating the corresponding aral-amine with a strongly basic hydroxide, such as sodium hydroxide to give the sodium hydroxylate of the aldehyde. Hydroxides of the alkali metals or the alkaline earth metals may be used. The process is illustrated by the following equation:

OH.R.CH:N.R′ + NaOH → ONa.R.CHO + H₂N.R′ where R and R′ are aryl groups, substituted or unsubstituted.

The aral-amine is easily obtained by reaction of the amine with the hydroxy aryl dithio acid. The reaction is illustrated by the following equation:

OH.R.C(:S).SH + H₂N.R′ →
OH.R.CH:N.R′ + H₂S + S where R and R′ are aryl groups.

The invention will be further illustrated in connection with the production of 2-hydroxy-1-naphthaldehyde, but it is to be understood that the invention is not limited thereto. For instance, the R of the aral group of the above equations may be a substituted or unsubstituted phenyl or naphthyl or anthracyl group. For example, R.OH may be salicylyl, dihydroxy-phenyl, α-hydroxy-naphthyl, β-hydroxy-naphthyl, 6-bromo-2-hydroxy-naphthyl. Any amine may be used, but since the amine does not appear in the final aldehyde, it will usually be advantageous to use aniline. Any substituted or unsubstituted phenyl, naphthyl or anthracyl amine may be employed, such as toluidine, anisidine, α and β naphthylamine, amino-phenols, etc.

The following specific example illustrates the invention:

PRODUCTION OF 2-HYDROXY-1-NAPHTHAL ANILINE

The following ingredients are mixed:

| | |
|---|---|
| 2-OH-dithionaphthoic acid | g-- 100 |
| Alcohol | c.c.-- 500 |
| Aniline | g-- 50 |

On adding the aniline, a suspension of the aniline salt of the dithio acid was first formed. On heating under a reflux condenser, this suspension slowly disappeared, accompanied by a vigorous evolution of H₂S gas, while the color of the solution slowly changed from deep red to a light reddish-yellow. Toward the end of the reaction, about one-half hour, crystals of sulfur separated in the refluxing liquid. The mixture was filtered hot and the filtrate cooled. Yellow crystals formed. After filtering, washing lightly with cold alcohol and drying, a heavy yield of bright-yellow needles, melting at about 90–91° C. was obtained.

This reaction is illustrated by the following equation:

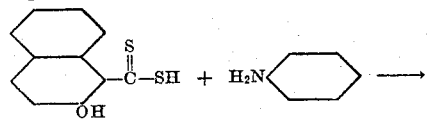

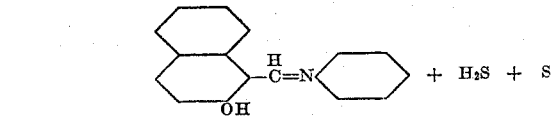

This reaction is covered in my copending application Serial No. 441,528, filed May 2, 1942, Patent No. 2,328,802.

CONVERSION TO ALDEHYDE

This conversion is carried out according to the following equation:

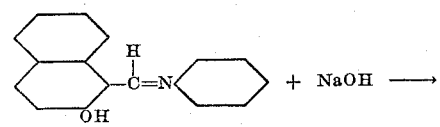

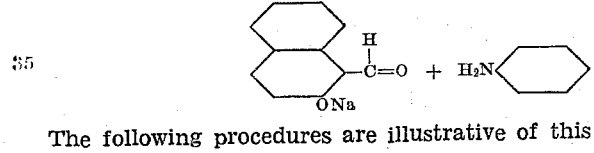

The following procedures are illustrative of this reaction:

Procedure A

The following materials were added to a flask:

| | |
|---|---|
| 2-OH-naphthal-aniline | g-- 25 |
| Water | c.c.-- 200 |
| NaOH | g-- 7.5 |

The mixture was stirred and refluxed, the condensate returning to the flask through a dropping funnel containing a layer of benzene, to extract the aniline. After two hours, 50 g. of NaCl were added, causing an immediate precipitation of the sodium hydroxylate of the aldehyde. The reaction mixture was cooled, filtered and washed with 10% NaCl solution and then with alcohol. A large crop of pale tan colored crystals was obtained.

*Procedure B*

The following materials were mixed:

| | | |
|---|---|---|
| 2-OH-naphthal-aniline | g | 25 |
| Alcohol | c.c. | 100 |
| NaOH in 5 c.c. H$_2$O | g | 5 |

The mixture was refluxed. A thick suspension of the sodium hydroxylate naphthaldehyde separated almost immediately. After one-half hour the reaction mixture was filtered hot and the precipitate of yellow crystals washed with alcohol. The reaction is substantially irreversible because the sodium hydroxylate is insoluble in alcohol and the aniline is soluble in the alcohol.

What I claim is:

1. The method of producing the sodium hydroxylate of an aryl aldehyde which comprises reacting an hydroxy aral amine with sodium hydroxide.

2. The method of producing the sodium hydroxylate of a naphthaldehyde which comprises treating an hydroxy naphthal amine with a strong alkali.

3. The method of producing the sodium hydroxylate of a naphthaldehyde which comprises refluxing the corresponding hydroxy naphthal amine with a strong alkali.

4. The method of producing 2-sodium hydroxylate-1-naphthaldehyde which comprises refluxing 2-hydroxy naphthal aniline with caustic.

5. The method of producing the sodium hydroxylate of an aryl aldehyde which comprises reacting an hydroxy aral amine with sodium hydroxide in an organic medium in which the hydroxylate is insoluble and the resulting amine is soluble, and separating the insoluble product from the solution.

6. The method of producing 2-sodium hydroxylate-1-naphthaldehyde which comprises refluxing 2-hydroxy naphthal aniline with caustic in alcohol, and separating the insoluble product from the alcohol solution.

ALBERT F. HARDMAN.